United States Patent [19]
Meyers

[11] 3,822,573
[45] July 9, 1974

[54] APPARATUS FOR LOCKING GEAR SHIFT STICK AND HANDBRAKE LEVER OF A MOTOR VEHICLE

[75] Inventor: Calvin E. Meyers, Freeport, N.Y.

[73] Assignee: Bug-Lok Corporation, Freeport, N.Y.

[22] Filed: Mar. 22, 1973

[21] Appl. No.: 343,689

[52] U.S. Cl. ................................. 70/200, 70/238
[51] Int. Cl. ..................... B60r 25/06, B60r 25/08
[58] Field of Search ............ 70/181, 199, 200, 202, 70/203, 232, 238, 247, DIG. 58

[56] References Cited
UNITED STATES PATENTS
3,550,409  12/1970  Pariser .............................. 70/203
FOREIGN PATENTS OR APPLICATIONS
807,760   7/1951  Germany ............................ 70/238
624,099   3/1927  France ............................... 70/202
925,217   8/1947  France ............................... 70/238
865,204   4/1961  Great Britain ..................... 70/238
1,223,123 2/1971  Great Britain ..................... 70/238

Primary Examiner—Albert G. Craig, Jr.
Attorney, Agent, or Firm—Richard P. Fennelly

[57] ABSTRACT

An apparatus for locking the gear shift stick and handbrake lever of a motor vehicle. The apparatus is a cylindrical body having a bore therein terminating in an open end which fits over the handbrake lever. The open end of the body holds a bolt which can be locked therein by a padlock and which abuts an enlarged portion of the handbrake lever preventing removal of the body therefrom. The other end of the body has a hook-shaped gripping member which simultaneously tightly holds a portion of the gear shift stick.

4 Claims, 3 Drawing Figures

PATENTED JUL 9 1974        3,822,573

APPARATUS FOR LOCKING GEAR SHIFT STICK AND HANDBRAKE LEVER OF A MOTOR VEHICLE

BACKGROUND OF THE INVENTION

The invention relates to an apparatus which can be used to lock the handbrake lever and gear shift stick of a motor vehicle, such as a Volkswagen or any other car having a similar configuration for these two elements of the vehicle. The device is an improvement over the locking mechanisms shown in the following U.S. Pat. Nos. 1,142,845; 1,179,275; 1,211,217; 1,222,456; 1,274,427; 1,329,644; 1,349,973; 1,411,728; 1,421,353; 1,440,823; 1,448,462; 1,528,563; and 1,628,731.

SUMMARY OF THE INVENTION

The present invention comprises a body having a bore therein which terminates at an open end of the body. The open end is adapted to receive and hold a portion of the handbrake lever. A gripping member is provided at the other end of the body to hold a portion of the gear shift stick. A hole adjacent the open end of the body at right angles to the axis of the bore in the body holds a bolt which can be locked in position against a portion of handbrake lever to hold the entire apparatus securely in place.

BRIEF DESCRIPTION OF THE DRAWINGS

The invention is best understood by referring to the specification and drawings which are appended hereto and which form a portion of the specification wherein.

DESCRIPTION OF A PREFERRED EMBODIMENT

Figure 1:
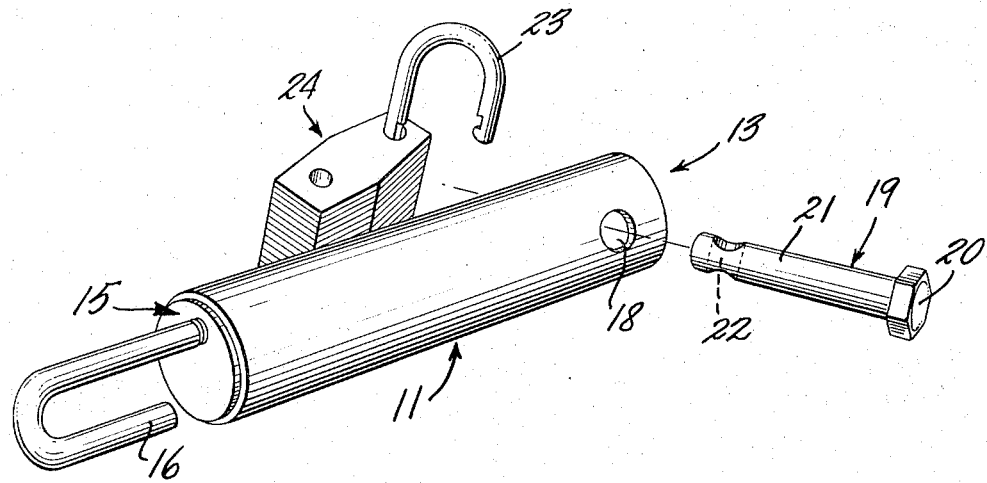
FIG. 1 is a perspective view showing the invention prior to its being locked.

FIG. 1 shows the invention in its open, unlocked configuration. It comprises a body 11 having a bore 12 formed therein which terminates at an open end 13 of the body. This end 13 is adapted to fit over and be locked to a handbrake lever 14 of the vehicle. The body is preferably cylindrical although other shapes can be used. The other end 15 of the body 11 has a gripping member 16 which is adapted to hold a portion of the gear shift stick 17 of the vehicle. Preferably, the gripping member 16 is hook-shaped and the end 15 is closed.

Figure 3:
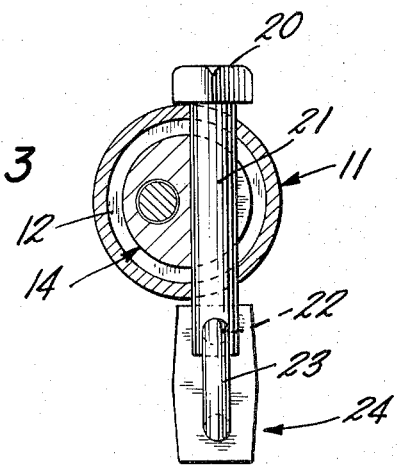
FIG. 3 is an end view of the invention in section also showing the invention after it has been locked.
Figure 2:
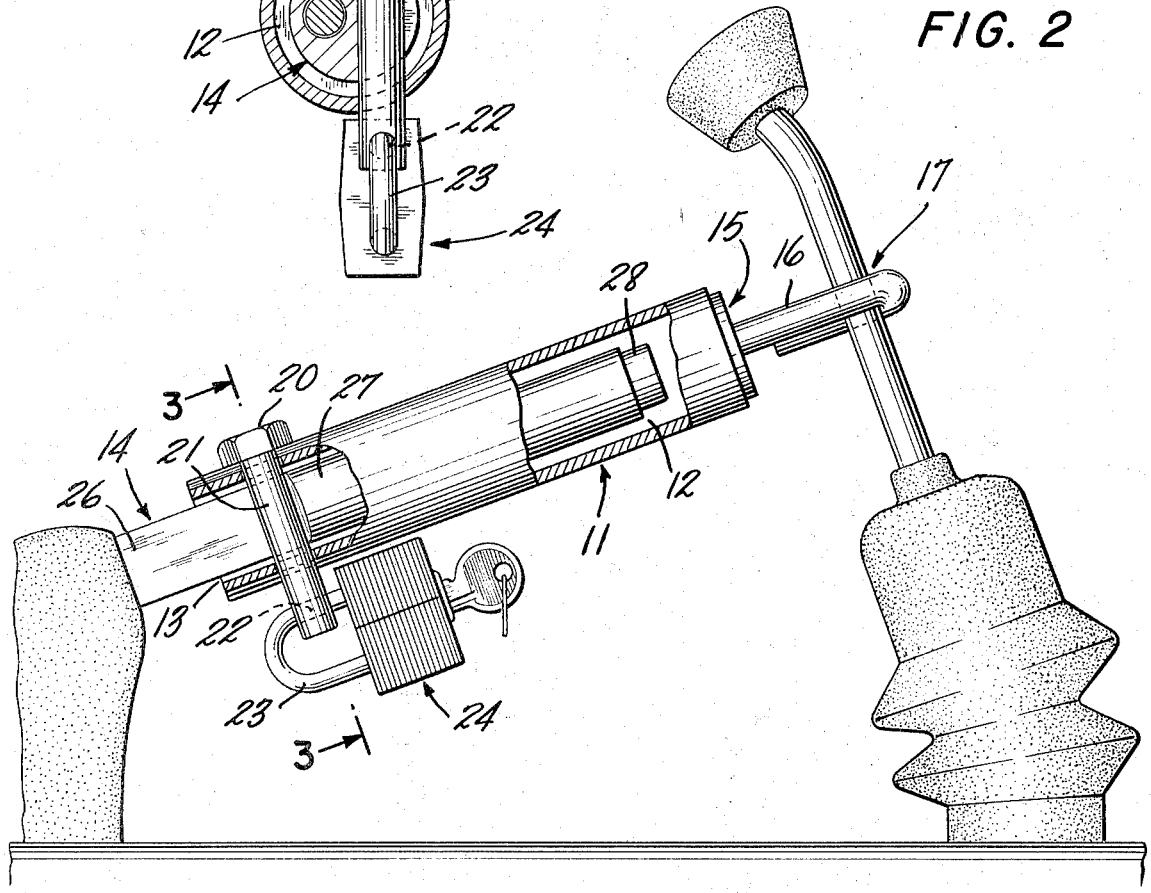
FIG. 2 is a side view, partially cut away, showing the invention locked to the gear shift stick and handbrake lever of a motor vehicle.

Adjacent the open end 13 of the body 11 is an open bore 18 which lies at right angles to the axis of bore 12. This bore 18 accommodates a bolt 19 which has a head 20 and a shank 21. The shank 21 also has a bore 22 formed therein adjacent its end which holds the shackle 23 of a padlock 24 when the apparatus of the present invention is locked as is shown in FIGS. 2 and 3.

The apparatus is quite easily utilized. The first step is the placement of the handbrake lever 14 into the bore 12 of the body 11 after the transmission of the car has been placed into reverse gear and the parking brake is in its raised or activated position. As the open end 13 is placed over and moved down the handbrake lever 14 the gripping member is simultaneously moved towards the gear shift stick 17 until the body 11 occupies the position shown in FIG. 2. At this point the bolt 19 is inserted into bore 18 which is slightly offset from the central axis of the bore 12 as best seen in FIG. 3. The bolt 19 lies next to a reduced diameter portion 26 of handbrake lever 14 and therefore abuts an enlarged portion 27. The head 20 and the bore 22 in the bolt 19 lie on opposite sides of the body 11 from one another. The shackle 23 of the padlock 24 is then inserted into the bore 22 and the padlock is locked. This securely holds bolt 19 in body 11 and prevents the removal of end 13 from the handbrake lever. A person cannot depress release button 28 through the closed end 15 of body 11 and cannot move the gear shift stick 17 forward out of reverse gear due to gripping member 16. The car is therefore securely held in reverse gear with the parking brake in its activated position thereby effectively precluding theft of the vehicle.

A person in the art upon reading the foregoing specification will become aware of modifications which can be made to the invention disclosed herein without the exercise of inventive skill. Therefore, the foregoing is merely intended to be illustrative of preferred embodiments of the invention. The appended claims define the scope of protection sought.

I claim:

1. An apparatus for locking the gear shift stick and handbrake lever of a motor vehicle comprising a two-ended body having an internal longitudinal bore which forms at one end thereof an open end for the body which is adapted to fit over and hold within the body a portion of the handbrake lever of the vehicle, said body having a hook-shaped gripping member at the end opposite from the open end of the body which is adapted to hold a portion of the gear shift stick, said open end of the body being adapted to be locked to the handbrake lever by a bolt and padlock assembly, said bolt residing in a bore which lies through the body at right angles to the longitudinal bore, said bore being slightly offset from the center line of the body so that it lies immediately adjacent a portion of the handbrake, said bolt having the end bore adjacent the end of its shank which is adapted to receive the shackle of a padlock when the device is locked.

2. An apparatus as claimed in claim 1 wherein the body is cylindrical.

3. An apparatus as claimed in claim 1 wherein the bolt has a head which lies on one side of the body and a shank end which lies on the opposite side of the body.

4. An apparatus as claimed in claim 1 wherein the gripping member is joined to a closed end of the body.

* * * * *